United States Patent
Dingle et al.

(10) Patent No.: US 8,056,128 B1
(45) Date of Patent: Nov. 8, 2011

(54) SYSTEMS AND METHODS FOR DETECTING POTENTIAL COMMUNICATIONS FRAUD

(75) Inventors: Adam Dingle, San Francisco, CA (US); Niels Provos, Mountain View, CA (US); Fritz Schneider, San Francisco, CA (US); Matt Cutts, Mountain View, CA (US)

(73) Assignee: Google Inc., Mountain View, CA (US)

( * ) Notice: Subject to any disclaimer, the term of this patent is extended or adjusted under 35 U.S.C. 154(b) by 909 days.

(21) Appl. No.: 10/954,007

(22) Filed: Sep. 30, 2004

(51) Int. Cl.
*G06F 12/14* (2006.01)

(52) U.S. Cl. .......................................... 726/22

(58) Field of Classification Search ............. 726/22
See application file for complete search history.

(56) References Cited

U.S. PATENT DOCUMENTS

| | | | | |
|---|---|---|---|---|
| 5,832,212 | A * | 11/1998 | Cragun et al. | 726/2 |
| 6,112,203 | A * | 8/2000 | Bharat et al. | 707/5 |
| 6,115,509 | A * | 9/2000 | Yeskel | 382/309 |
| 6,778,975 | B1 * | 8/2004 | Anick et al. | 707/1 |
| 6,917,980 | B1 * | 7/2005 | Gusler et al. | 709/229 |
| 2002/0069370 | A1 * | 6/2002 | Mack | 713/201 |
| 2002/0143871 | A1 * | 10/2002 | Meyer et al. | 709/204 |
| 2002/0169770 | A1 * | 11/2002 | Kim et al. | 707/5 |
| 2004/0073617 | A1 * | 4/2004 | Milliken et al. | 709/206 |
| 2004/0078422 | A1 * | 4/2004 | Toomey | 709/202 |
| 2005/0015626 | A1 * | 1/2005 | Chasin | 713/201 |
| 2005/0080774 | A1 * | 4/2005 | Janssen et al. | 707/3 |
| 2007/0101423 | A1 * | 5/2007 | Oliver et al. | 726/22 |

OTHER PUBLICATIONS

Neil Chou et al.; "Client-Side Defense Against Web-Based Identity Theft"; Computer Science Department, Stanford University; Feb. 2004; 16 pages.
Co-pending U.S. Appl. No. 10/748,664, filed Dec. 31, 2003, entitled "Information Retrieval Based on Historical Data," Anarag Acharya et al., 53 page specification, 4 sheets of drawings.

* cited by examiner

*Primary Examiner* — Nasser Moazzami
*Assistant Examiner* — Michael S McNally
(74) *Attorney, Agent, or Firm* — Harrity & Harrity, LLP

(57) ABSTRACT

A system includes a data repository and a processing unit. The data repository stores data associated with a corpus of documents hosted on one or more servers. The processing unit analyzes data associated with a suspect document from the corpus of documents. The processing unit further assigns a score, based on the analyzed data, to the suspect document that indicates whether the suspect document is potentially fraudulent.

88 Claims, 11 Drawing Sheets

| DOCUMENT ID 415 | FRAUD SCORE 420 | TRUSTWORTHINESS 425 |
|---|---|---|
| document_id_1 | $F_{SC1}$ | T |
| document_id_2 | $F_{SC2}$ | T |
| document_id_3 | $F_{SC3}$ | U |
| --- | --- | --- |
| document_id_n | $F_{SCn}$ | T |

DATA TABLE 405

TABLE ENTRIES 410

FIG. 4

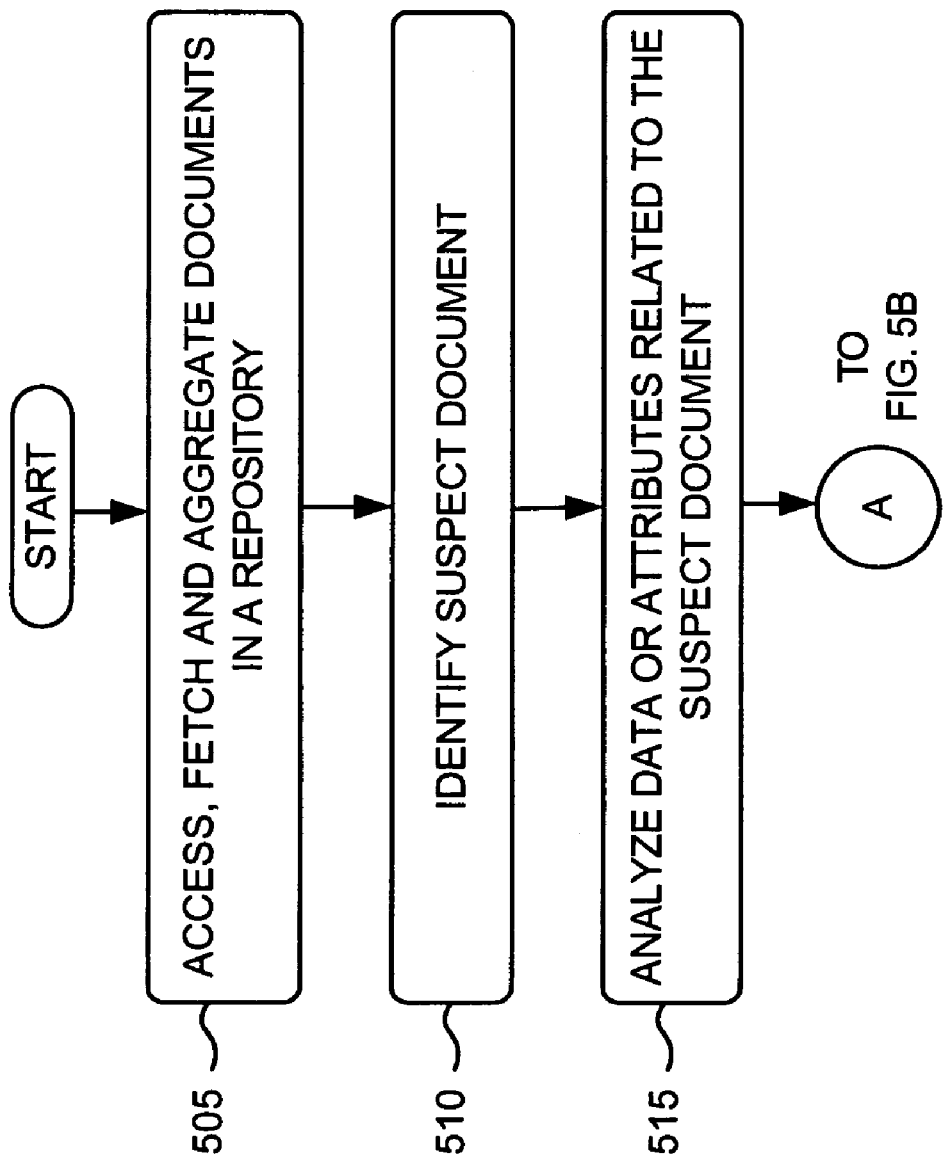

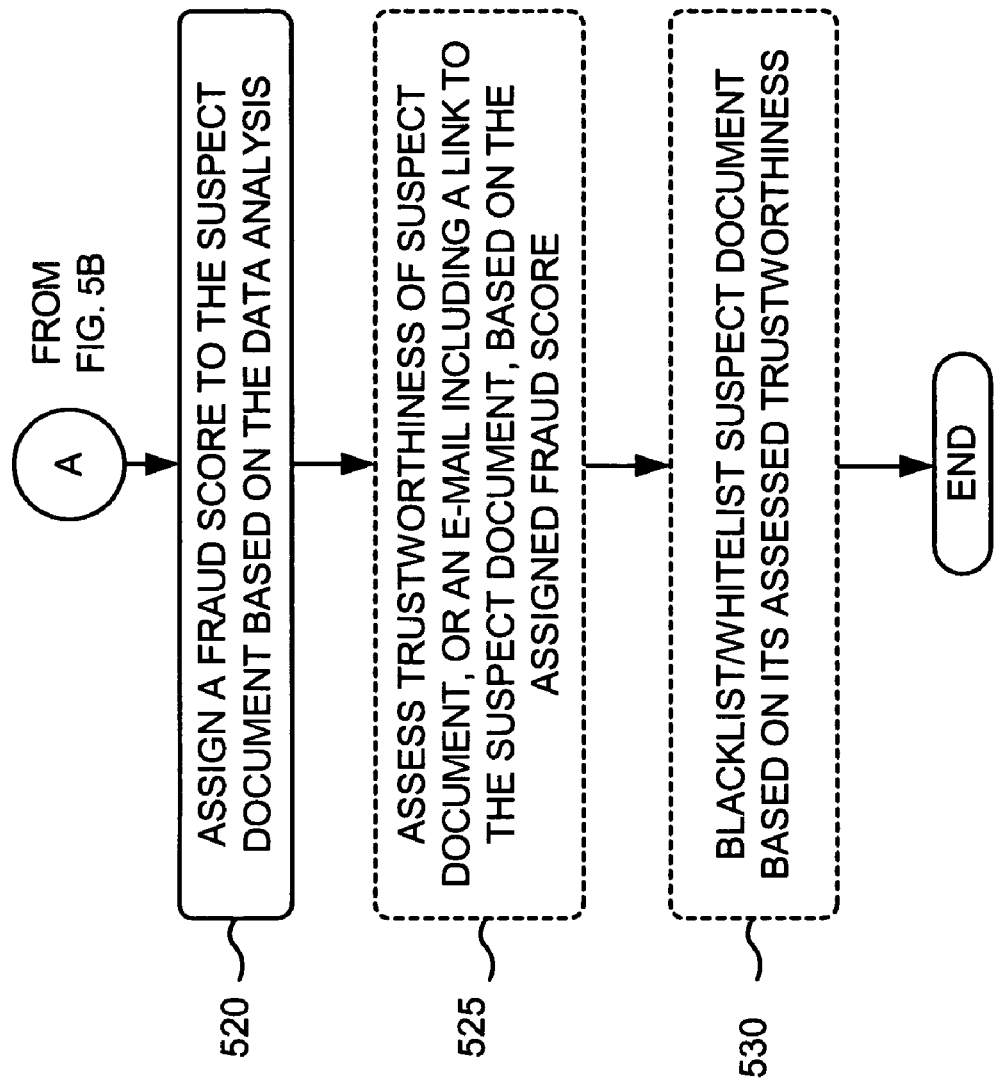

SYSTEMS AND METHODS FOR DETECTING POTENTIAL COMMUNICATIONS FRAUD

BACKGROUND

1. Field of the Invention

Systems and methods consistent with the principles of the invention relate generally to communications and, more particularly, to detecting potential communications fraud.

2. Description of Related Art

The advent and rise of the Internet has permitted the widespread use of electronic forms of communication across vast distances at high speed. The ubiquitousness of Internet communications has led, however, to various attempts to misuse such communications in a fraudulent manner. One such type of fraudulent communication involves the attempt by one party to impersonate another trusted party. For example, in the context of accessing documents, such as from sites on the Internet, accessed documents may appear to be hosted by a trusted party, and the accessed documents may request that a user divulge personal information such as account name and password, bank information, or other private or personal data. Any personal information divulged to the impersonating site may subsequently be fraudulently misused. Another type of fraudulent communication involves e-mails that possibly include falsified headers or addressing information that claim to be from another party. Such e-mails may include links to fake documents that request a user to divulge personal information.

Certain types of fraudulent communications originating from an impersonating party, therefore, may be mistaken as originating from a trusted other party resulting in the divulging of confidential personal information that can be fraudulently misused.

SUMMARY OF THE INVENTION

According to one aspect consistent with the principles of the invention, a method may include determining whether a document requests personal information and analyzing, if the document requests personal or private information, data or attributes associated with the document to determine a trustworthiness of the document. The method may further include designating the document as one of trustworthy or untrustworthy based on the analysis.

According to another aspect, a method may include identifying a document as being suspect based on whether the document requests personal or private information from a user and analyzing data or attributes associated with the suspect document. The method may further include assigning a score, based on the data analysis, to the suspect document that indicates whether the suspect document is potentially fraudulent.

According to a further aspect, a method may include analyzing data or attributes associated with a document hosted on a server to determine if the document is trustworthy or untrustworthy, where the document is untrustworthy if it is determined that it is potentially fraudulent. The method may further include inhibiting access to the document if the document is designated as untrustworthy.

BRIEF DESCRIPTION OF THE DRAWINGS

The accompanying drawings, which are incorporated in and constitute a part of this specification, illustrate embodiments of the invention and, together with the description, explain the invention. In the drawings.

FIG. 4 is a diagram of an exemplary data table that may indicate document trustworthiness consistent with principles of the invention;

FIGS. 5A and 5B are flowcharts of an exemplary process for assessing the trustworthiness of a suspect document consistent with principles of the invention;

DETAILED DESCRIPTION

The following detailed description of the invention refers to the accompanying drawings. The same reference numbers in different drawings may identify the same or similar elements. Also, the following detailed description does not limit the invention.

According to aspects of the invention, methods and systems are provided that automatically detect if electronic communication (e.g., e-mail) or documents (e.g., Internet web pages) attempt to steal the identity of users by deceiving them into divulging private information, such as social security numbers, dates of birth, passwords, etc. Implementations consistent with aspects of the invention may alert a user, or inhibit access, to untrustworthy electronic communication or documents.

A "document," as the term is used herein, is to be broadly interpreted to include any machine-readable and machine-storable work product. A document may include an e-mail, a web site, a file, one or more digital images, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as JavaScript, etc.). A "link" as the term is used here, is to be broadly interpreted to include any reference to or from a document.

Exemplary Overview

Figure 1:
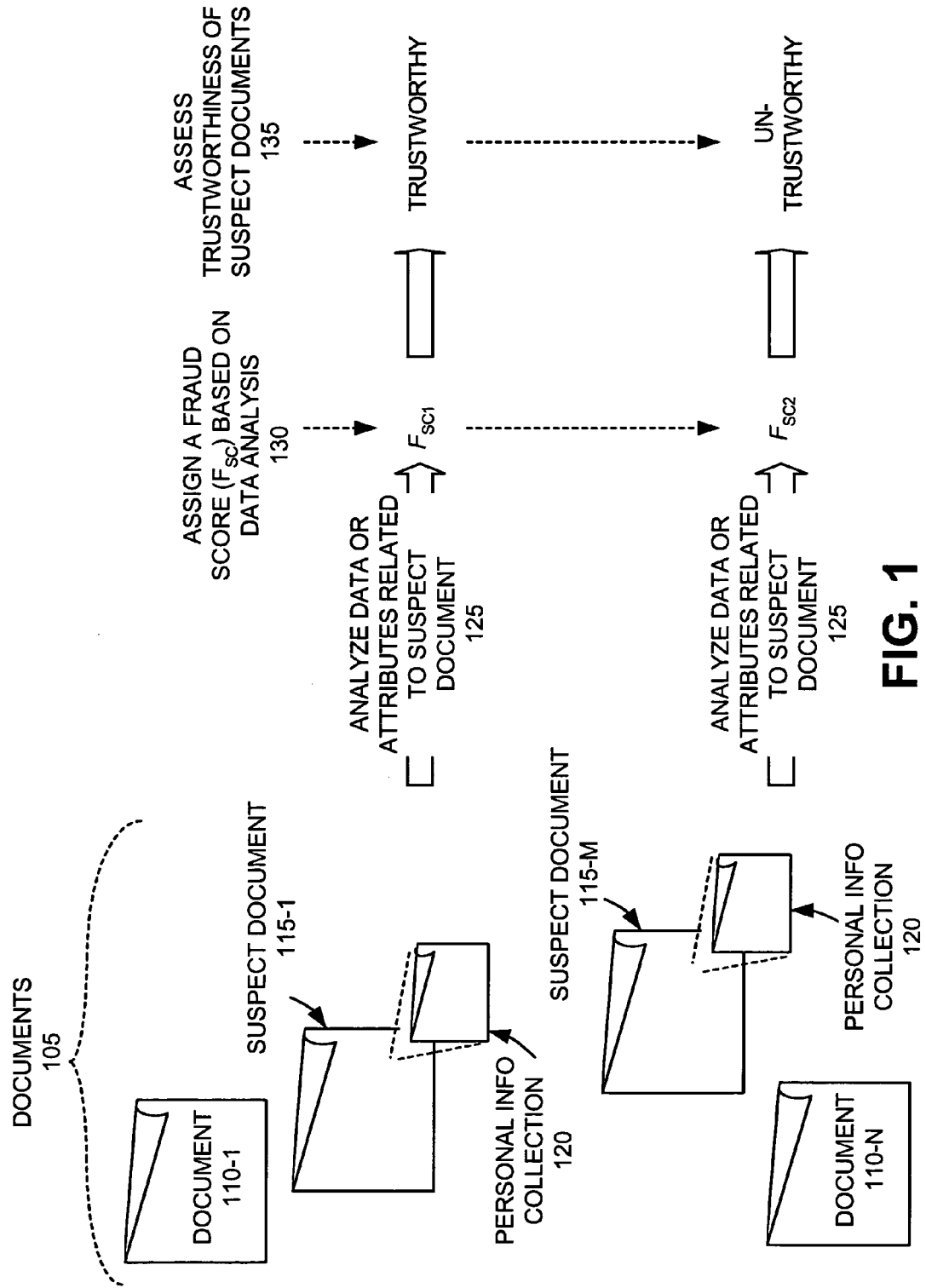
FIG. 1 is a diagram of an overview of an exemplary aspect of the invention.

FIG. 1 illustrates an overview of assessing the trustworthiness of documents according to an exemplary aspect of the invention. Multiple documents 105 may be hosted or stored at one or more distributed locations, such as, for example, on one or more servers in the Internet. Documents 105 may include non-suspect documents 110-1 through 110-N and suspect documents 115-1 through 115-M. Suspect documents 115 may be identified as suspect (i.e., being possibly untrustworthy or fraudulent) using various techniques. In one exemplary technique, suspect documents 115 may be identified as suspect if the documents are determined to collect private or personal information 120 from users accessing documents 115. Such private/personal information may include account names and passwords, bank information, social security numbers, or any other type of private/personal data.

Data or attributes related to the identified suspect documents 115 may be analyzed 125. Various different kinds of data or attributes, as will be further described below, may be analyzed, either singly or in various combinations, consistent with aspects of the invention. Each of the various data or attributes may correlate in some fashion to the trustworthiness or untrustworthiness of the suspect document 115 to which the data relates.

A fraud score ($F_{SC}$) may be assigned 130 to each of the suspect documents 115 based on the data analysis. The fraud score may provide an indication of the trustworthiness of the associated suspect document 115. The trustworthiness of suspect documents 115 may then, optionally, be assessed 135 based on the assigned fraud scores. In one implementation, a high fraud score may indicate that the associated suspect document 115 is not trustworthy whereas a low fraud score may indicate that the associated suspect document 115 is trustworthy.

Exemplary Network Configuration

Figure 2:
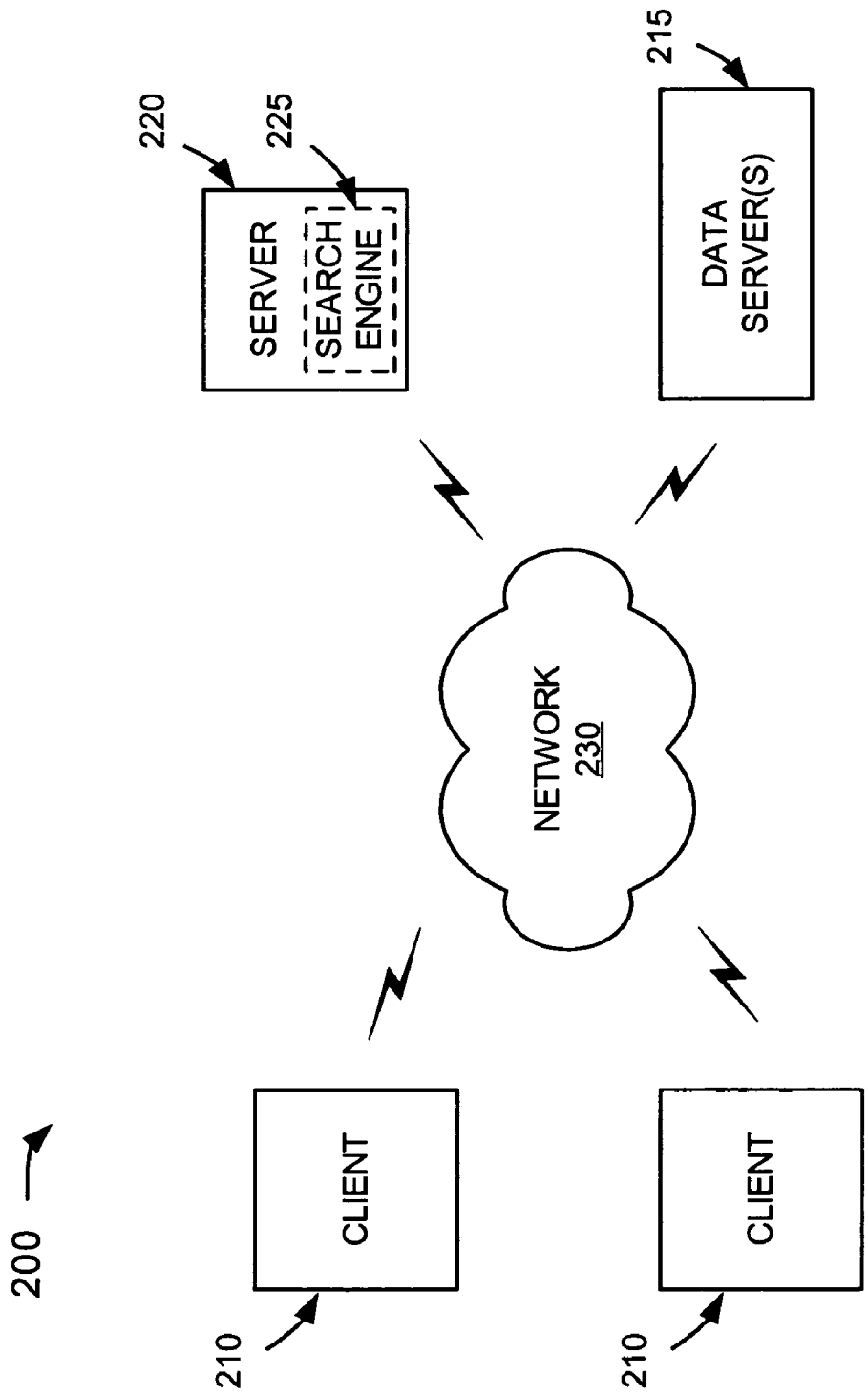
FIG. 2 is a diagram of an exemplary network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220 and 215 via a network 230. Network 230 may include a local area network (LAN), a wide area network (WAN), a telephone network, such as the Public Switched Telephone Network (PSTN), an intranet, the Internet, a memory device, another type of network, or a combination of networks. Two clients 210 and two servers 220 and 215 have been illustrated as connected to network 230 for simplicity. In practice, there may be more or fewer clients and servers. Also, in some instances, a client may perform the functions of a server and a server may perform the functions of a client.

Clients 210 may include client entities. An entity may be defined as a device, such as a wireless telephone, a personal computer, a personal digital assistant (PDA), a laptop, or another type of computation or communication device, a thread or process running on one of these devices, and/or an object executable by one of these devices. Servers 220 and 215 may include server entities that access, fetch, aggregate, process, search, and/or maintain document's in a manner consistent with the principles of the invention. Clients 210 and servers 220 and 215 may connect to network 230 via wired, wireless, and/or optical connections.

In an implementation consistent with the principles of the invention, server 220 may include a search engine 225 usable by users at clients 210. Server 220 may implement a data aggregation service by crawling a corpus of documents (e.g., web pages) hosted on data server(s) 215 and store information associated with these documents in a repository of crawled documents. The data aggregation service may be implemented in other ways, such as by agreement with the operator(s) of data server(s) 215 to distribute their hosted documents via the data aggregation service. Search engine 225 may execute a query, received from a user, on the corpus of documents hosted on data server(s) 215. Server 220 may also perform an analysis of suspect documents and/or e-mails (including web-based e-mails), as described below with respect to FIGS. 5A, 5B, 6A, 6B and 6C, to determine if they are potentially fraudulent (e.g., potentially impersonating authentic documents or e-mails). To perform this analysis, server 220 may exchange messages with various clients 210, including exchange messages with browsers implemented at such clients.

Server(s) 215 may store or maintain documents that may be crawled by server 220. Such documents may include data related to published news stories, products, images, user groups, geographic areas, or any other type of data. For example, server(s) 215 may store or maintain news stories from any type of news source, such as, for example, the Washington Post, the New York Times, Time magazine, or Newsweek. As another example, server(s) 215 may store or maintain data related to specific product data, such as product data provided by one or more product manufacturers. As yet another example, server(s) 215 may store or maintain data related to other types of web documents, such as pages of web sites.

While servers 220 and 215 are shown as separate entities, it may be possible for one or more of servers 220 and 215 to perform one or more of the functions of another one or more of servers 220 and 215. For example, it may be possible that two or more of servers 220 and 215 are implemented as a single server. It may also be possible for a single one of servers 220 or 215 to be implemented as two or more separate (and possibly distributed) devices.

Exemplary Client/Server Architecture

Figure 3:
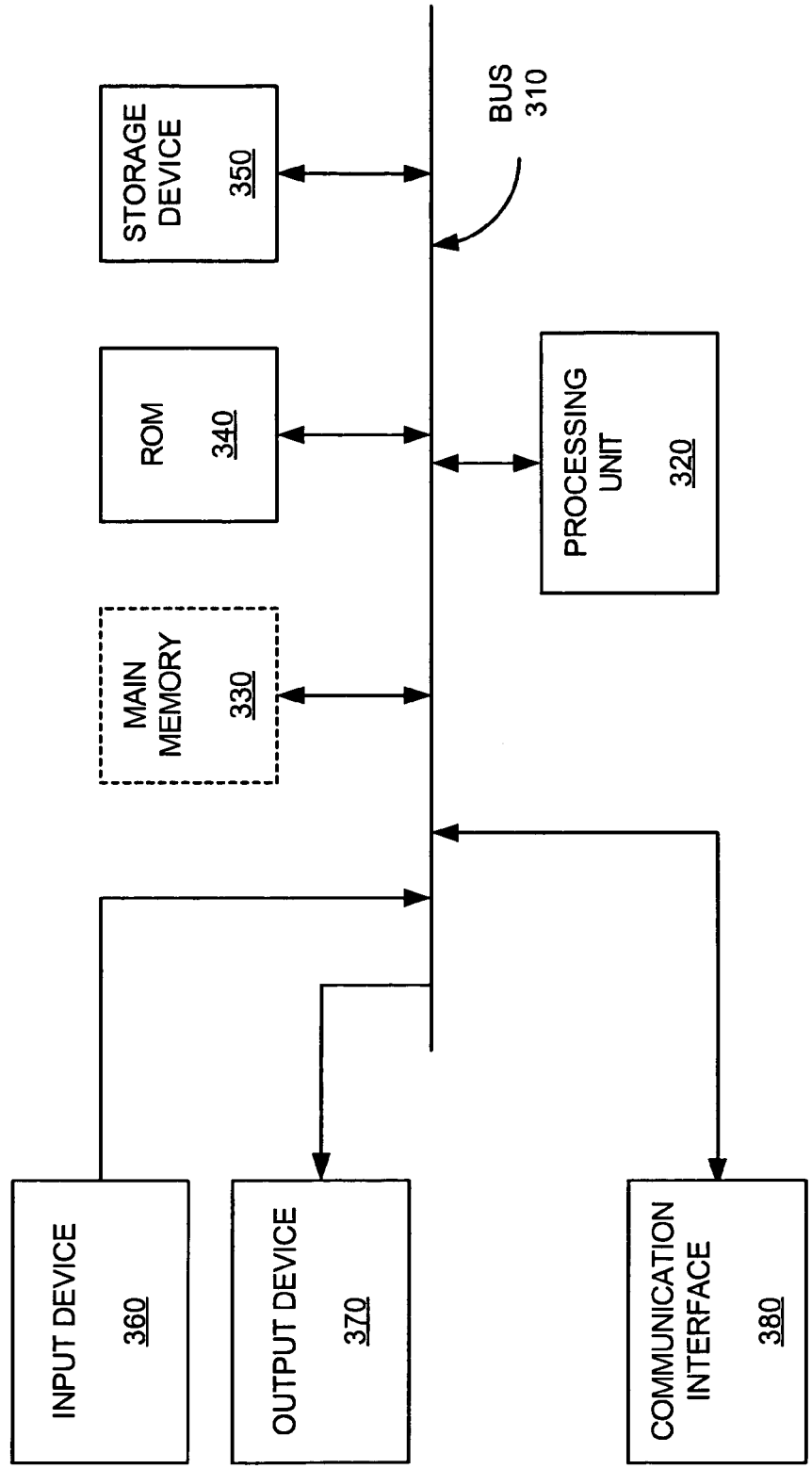
FIG. 3 is an exemplary diagram of a client and/or server of FIG. 2 in an implementation consistent with the principles of the invention.

FIG. 3 is an exemplary diagram of a client or server entity (hereinafter called "client/server entity"), which may correspond to one or more of clients 210 and servers 220 and 215, according to an implementation consistent with the principles of the invention. The client/server entity may include a bus 310, a processing unit 320, an optional main memory 330, a read only memory (ROM) 340, a storage device 350, an input device 360, an output device 370, and a communication interface 380. Bus 310 may include a path that permits communication among the components of the client/server entity.

Processing unit 320 may include any type of software, firmware or hardware implemented processing device, such as a microprocessor, a field programmable gate array (FPGA), combinational logic, etc. Main memory 330 may include a random access memory (RAM) or another type of dynamic storage device that stores information and instructions for execution by processing unit 320, if processing unit 320 includes a microprocessor. ROM 340 may include a conventional ROM device or another type of static storage device that stores static information and/or instructions for use by processing unit 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or other biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 230.

As will be described in detail below, the client/server entity, consistent with the principles of the invention, may perform certain data processing operations. The client/server entity may, in some implementations, perform these operations in response to processing unit 320 executing software instructions contained in a computer-readable medium, such as memory 330. A computer-readable medium may be defined as one or more physical or logical memory devices and/or carrier waves.

The software instructions may be read into memory 330 from another computer-readable medium, such as data storage device 350, or from another device via communication interface 380. The software instructions contained in memory 330 may cause processing unit 320 to perform processes that will be described later. Alternatively, hardwired circuitry may be used in place of, or in combination with, software instructions to implement processes consistent with the principles of the invention. Thus, implementations consistent with principles of the invention are not limited to any specific combination of hardware circuitry and software.

Exemplary Data Table

FIG. 4 is a diagram of an exemplary data table 405 that may indicate document trustworthiness consistent with principles of the invention. Table 405 may be stored in main memory 330, ROM 340 or storage device 350 of a client 210 or server 220. Table 405 may include multiple entries 410, with each entry corresponding to a different document identified by a document identifier 415. In one implementation, each document identifier 415 may include a uniform resource locator (URL) associated with a respective document hosted on a server. Each entry 410 of table 405 may associate a fraud score 420, and an optional indication of trustworthiness 425, with a corresponding document identifier 415. Fraud score 420 and trustworthiness value 425 may be determined as further described below with respect to FIGS. 5A, 5B, 6A, 6B and 6C. Fraud score 420 may provide a relative indication of the trustworthiness of the respective document identified by document ID 415. Trustworthiness value 425 may provide a conclusory indication of the trustworthiness of a respective document, identified by document ID 415, that is assessed based on a respective fraud score 420. It will be appreciated that table 405 may include other information from that identified in FIG. 4.

Exemplary Document Trustworthiness Assessment Process

FIGS. 5A and 5B are flowcharts of an exemplary process for assessing the trustworthiness of a document according to an implementation consistent with the principles of the invention. As one skilled in the art will appreciate, the process exemplified by FIGS. 5A and 5B can be implemented in software and stored on a computer-readable memory, such as main memory 330, ROM 340 or storage device 350 of server 220 or client 210, as appropriate. In other implementations, the processing exemplified by FIGS. 5A and 5B can be implemented in hardwired circuitry, such as combinational logic, within processing unit 320 of server 220 or client 210 as appropriate.

The exemplary process may begin with the accessing, fetching and aggregating of documents in a repository (act 505)(FIG. 5A). Server 220, for example, may "crawl" a corpus of documents hosted on data server(s) 215 and store information associated with these documents in a repository of crawled documents. A suspect document may be identified (act 510). In one implementation, server 220 may identify a suspect document. A document may be identified as suspect from documents aggregated in the document repository if it is determined that the suspect document attempts to collect private/personal information from users that may access the document. For example, the suspect document may attempt to induce accessing users to divulge private information such as, for example, account names and passwords, bank information, social security numbers, or any other type of personal or private data. Alternatively, an e-mail may be received that includes a link to a document. The document from the e-mail may be identified as suspect if it is determined that the document attempts to collect private/personal information from users that may access the document. In an additional implementation, a user's browser or plug-in at a client 210 may send a query to server 220 that inquires about a document that the user is accessing or is attempting to access. The query may include content from, or a "fingerprint" of, the document. In other implementations, documents may be identified as suspect using other techniques. A document identifier 415, corresponding to the identified suspect document, may be stored in data table 405.

Data or attributes related to the identified suspect document may be analyzed (act 515). Various data or attributes related to the identified suspect document may be analyzed, as further described with respect to FIGS. 6A-6C below. A fraud score may be assigned to the suspect document based on the results of the data analysis (act 520, FIG. 5B). Various algorithms may be used to functionally relate the results of the data analysis to the fraud score. In one implementation, the fraud score may be linearly related to the analyzed data. Other functional relationships may be employed to determine a fraud score from the analyzed data. The fraud score may weight the document related data or attributes based on past experience and new evidence. The assigned fraud score 420 may be stored in data table 405. In some implementations, server 220 may forward the assigned fraud score to users at clients 210 (e.g., to web browsers, browser toolbars at clients 210) attempting to access the suspect document. In another implementation, server 220 may forward the assigned fraud score to an e-mail application at a client 210 that has received an e-mail that includes the suspect document.

The trustworthiness of the suspect document, or the e-mail including a link to the suspect document, may then, optionally, be assessed based on the fraud score assigned to the suspect document (act 525). For example, if a suspect document has been assigned a "high" fraud score, then the suspect document and/or e-mail that included a link or reference to the suspect document may be determined to be untrustworthy. In contrast, if a suspect document and/or e-mail that included a link to the suspect document has been assigned a "low" fraud score, then the suspect document may be determined to be trustworthy. In one implementation, the fraud score assigned to the suspect document may be compared to a configurable threshold. If the assigned fraud score exceeds the threshold, then the suspect document may be determined to be untrustworthy. If the assigned fraud score is less than the threshold, then the suspect document may be determined to be trustworthy.

In another implementation, the fraud score assigned to the suspect document may be compared to multiple configurable thresholds. For example, if the fraud score is less than a first threshold, then the suspect document may be determined to be trustworthy. If the fraud score is greater than a second threshold, then the suspect document may be determined to be untrustworthy. If the fraud score is in between the first and second thresholds, then the trustworthiness of the suspect document may be ambiguous. Such documents may be brought to the attention of a user, or a system administrator, to resolve the ambiguity. An indication of the assessed trustworthiness 425 may be stored in data table 405.

Optionally, the suspect document, or e-mail including a link to the suspect document, may be "blacklisted" or "whitelisted" based on the document's assessed trustworthiness (act 530). Blacklisting of the suspect document or e-mail may include inhibiting access to the document or e-mail, or inhibiting transmission of personal/private data requested by the document or e-mail. For example, access to a document A, or to an e-mail including a link to document A, by a user may be inhibited if it has been blacklisted. As another example, if document X requests personal/private information from a user, transmission of any data entered by the user may be inhibited (i.e., not transmitted). Inhibiting access to a document or e-mail may require, for example, password access to enable user access to the document or e-mail. In one implementation, blacklisting of the suspect document or e-mail including a link to the suspect document may include denying access to the document. In the context of an e-mail including a link to a blacklisted suspect document, denial of access may include deletion of the e-mail prior to the e-mail being read by a receiving user. Whitelisting of the suspect document may include ensuring access to the document. For example, a user may freely access, or boost the priority of, a document B if it has been whitelisted. Blacklisting or whitelisting may be automatically performed based on the assessed trustworthiness of the suspect document, or may be manually performed in order to override the assessed trustworthiness of the suspect document based on the fraud score. Blacklisting or whitelisting may also draw from a pre-determined, or dynamically determined, list of known untrustworthy or known trustworthy servers, sites or documents.

Exemplary Document Related Data Analysis Process

Figure 6A:
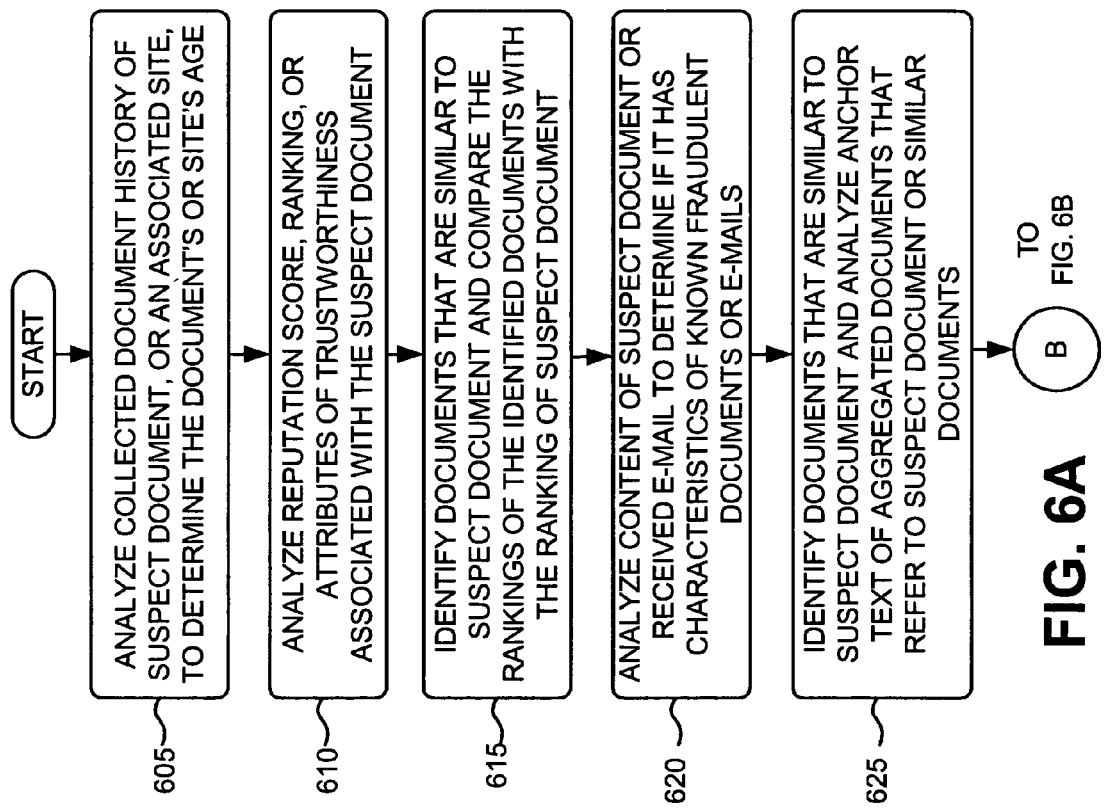
FIGS. 6A-6C are flowcharts of an exemplary process for analyzing a document consistent with principles of the invention.
Figure 6B:
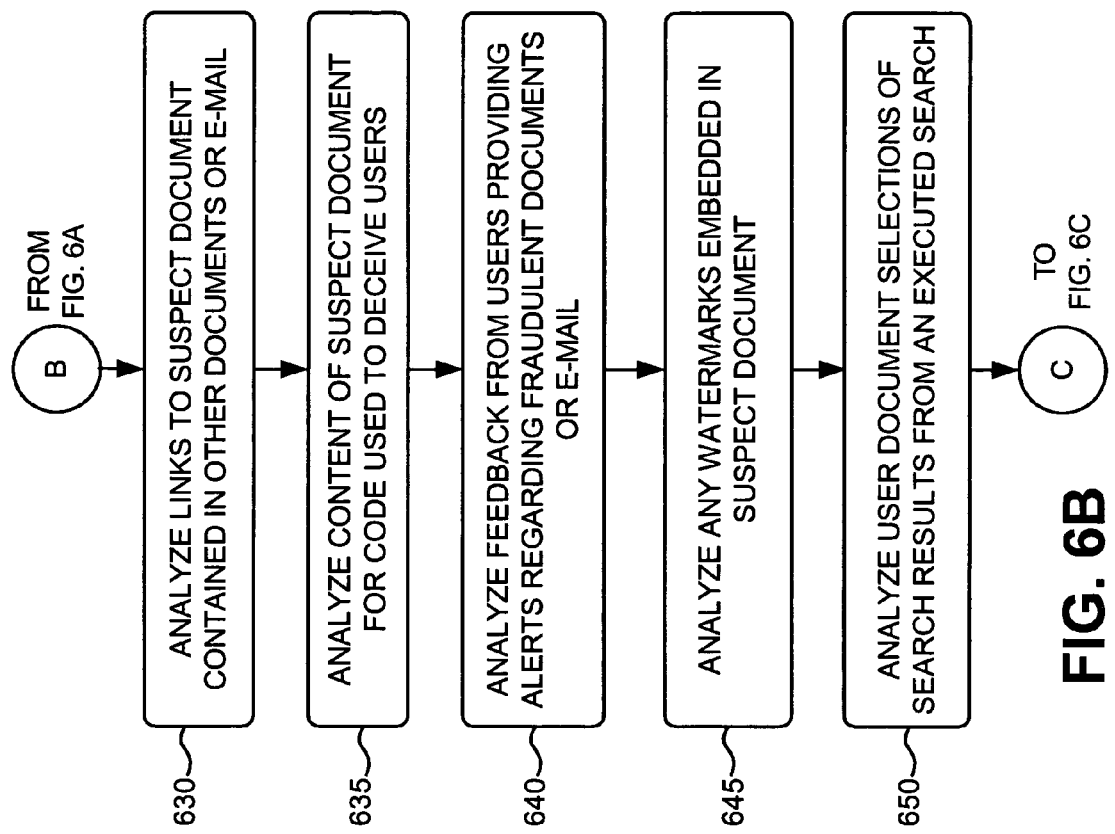
Figure 6C:
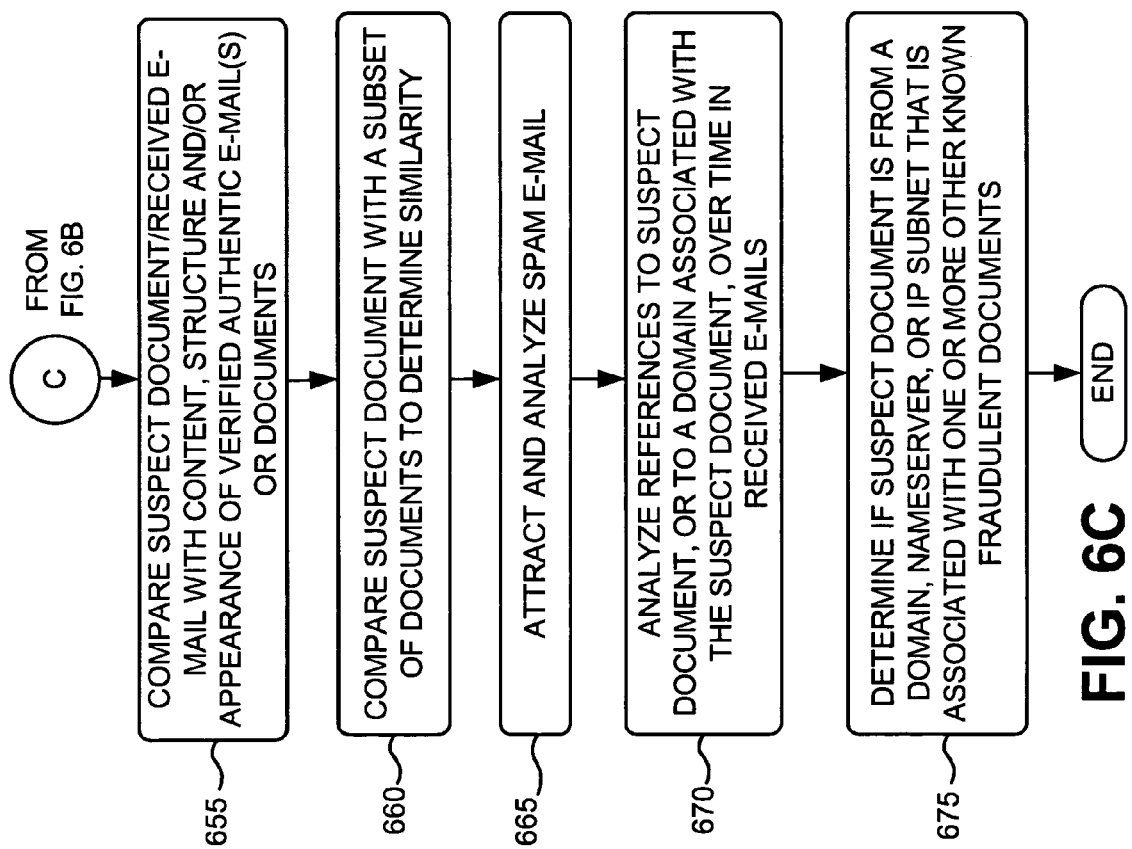

FIGS. 6A-6C are flowcharts of an exemplary process for analyzing a suspect document according to an implementation consistent with the principles of the invention. FIGS. 6A-6C provide further detail to 515 of FIG. 5A. As one skilled in the art will appreciate, the process exemplified by FIGS. 6A-6C can be implemented in software and stored on a computer-readable memory, such as main memory 330, ROM 340 or storage device 350 of server 220 or client 210, as appropriate. In other implementations, the processing exemplified by FIGS. 6A-6C can be implemented in hardwired circuitry, such as combinational logic, within processing unit 320 of server 220 or client 210, as appropriate.

The exemplary process may begin by analyzing a collected document history of the suspect document, an associated site, to determine the suspect document's age, or the age of the site associated with the document (act 605, FIG. 6A). In one implementation, the document history may be collected via existing "crawling" techniques, via user toolbars, domain name registry, and via looking for the earliest link or reference to a domain or document, or page rank histograms to determine the age of the suspect document. Fraudulent documents usually are relatively new (i.e., do not persist for a long time period), therefore, a new document may be more likely to be fraudulent than an old document. The ranking, reputation score, or attributes of trustworthiness associated with the suspect document may be analyzed (act 610). The results of an existing ranking mechanism, such as PageRank, that indicates how well known a document is, may be analyzed. Fraudulent documents may have lower rank than other non-fraudulent documents.

Documents, from a set of documents previously aggregated, may be identified that are similar to the suspect document and the rankings of the identified documents may be compared with the ranking of the suspect document (act 615). For example, if the similar documents have a much higher rank than the suspect document, the suspect document is more likely to be fraudulent. Documents may be determined to be similar to the suspect document based on the contents of the documents and/or the link structures contained in the documents.

The content of the suspect document, or received e-mail containing a link to the suspect document, may be analyzed to determine if it has characteristics of known fraudulent documents or e-mails (act 620). For example, many fraudulent documents do not use secure hypertext transfer protocol (HTTPS) for login, use invalid secure sockets layer (SSL) certificates, or have obviously invalid domain name registry information. Furthermore, fraudulent documents usually have less "depth" (i.e., less complexity, quantity and/or quality of information) in their content than non-fraudulent documents. Server 220 may analyze the content of the suspect document.

Documents that are similar to the suspect document may be identified and anchor text contained in other documents previously aggregated that refer to the suspect document or the similar documents may be analyzed (act 625). Anchor text may include text associated with a link from one document to another document. For example, in a hyper text markup language (HTML) hyperlink, the anchor text is the hyperlink text, which web browsers typically underline. As an example, if document C is similar to document D, but all of the anchor text contained in other documents previously aggregated refers to document D, then document C may be fraudulent. Links to the suspect document, contained in other documents or e-mail, may be analyzed (act 630, FIG. 6B). For example, uniform resource locators (URLs) of links to the suspect document may use "tricks" to fool a user into believing that the suspect document is trustworthy. For example, the domain name of the URL might be crafted such that the portion shown to the user resembles the URL of a trusted document, or the URL may employ username/passwords, long domain names, or IP addresses instead of domain names. Furthermore, "browser bugs" in the display of the URL may be exploited. Browser bugs may include flaws in a browser and/or mail client implementation that allow specifically crafted documents or e-mails to appear to be originating from a different domain than their actual domain. For example, a special character in a URL may cause a part of the URL to the left of the special character to be loaded in the browser while the part to the right may be shown to the user (e.g., if X is the special character, then you might have http://www.badguys.com/loginXwww.mybank.com/login).

The content of the suspect document may be analyzed for code that can be used to deceive users (act 635). For example, JavaScript may be used to cover the user's browser address bar with a custom HTML window containing the address of a trusted document. Also, JavaScript may be used to change the browser's status bar when the user "hovers" over a link in order to make it appear that selecting the link will take the user to a trusted document.

Feedback provided by users providing alerts regarding fraudulent documents or e-mails may be analyzed (act 640). A reputation system may be used to weigh the validity of the recommendations. If the sum of the weights is high enough, the suspect document may be blacklisted, or may be manually verified by an operator.

Watermarks embedded in the suspect document may be analyzed (act 645). In one aspect, if a specific digital watermark is found in an image of the suspect document that does not correspond to a URL of the suspect document, then the document may be fraudulent. For example, if a watermark normally inserted into a document produced by entity A is found in a document that has a URL that does not correspond to entity A, then the document is likely to be fraudulent. User document selections of search results from an executed search may be analyzed (act 650). For example, if a document claims to be produced by an entity B, but users rarely (i.e., user selections of the document are below a configurable threshold) go to the document after searching for "entity B," then the document may be fraudulent.

The suspect document, or received e-mail containing a link to the suspect document, may be compared with the content, structure and/or appearance of verified authentic documents or e-mail (act 655, FIG. 6C). The suspect document or received e-mail that has content, structure and/or appearance that is not similar to the verified authentic documents or e-mail may be considered untrustworthy. Received e-mail that has content, structure and/or appearance that is similar to the verified authentic e-mail, but that has links that are different (but possibly may appear similar) than the verified authentic e-mail, may also be considered untrustworthy. For example, if e-mail is received that is similar to verified e-mail, but has modified links, then the received e-mail may be flagged as being fraudulent.

The suspect document may be compared with a subset of documents to determine if it is similar to any of the subset of documents (act 660). If the suspect document is similar to a document of the subset of documents that is a "trusted" document and the suspect document requests personal/private information, then the suspect document may be attempting to "spoof" the trusted document and may, thus, be fraudulent. The suspect document may be compared to the subset of documents by, for example, analyzing portions of the parse trees of the documents' HTML (i.e., the syntax of the logical structure of the documents), subsets of contiguous words, human-readable language of the documents (by looking at words in the document, samples of words, number of words, etc.), and/or similar features of the documents.

Spam e-mail may be attracted and analyzed (act 665). Consistent with one aspect, "honeypots" may be used to attract spam e-mail. For example, if a user is asked, via an e-mail or a document, to go to a document associated with an entity D because terms of usage have been changed, the link(s) in the e-mail or the document may be verified as actually pointing to a document hosted by entity D. E-mail may be analyzed because e-mail may a primary avenue for fraudulent attempts to obtain personal/private information from a user. References to the suspect document, or to a domain associated with the suspect document, over time may further be analyzed (act 670). For example, if a suspect document has never been encountered before, but suddenly a burst of e-mails includes links to the suspect document, then the suspect document is more likely to be fraudulent.

A determination may be made whether the suspect document is from a domain, nameserver, or Internet Protocol (IP) subnet that is associated with one or more known fraudulent documents (act 675). For example, if many known fraudulent documents have been hosted on example.com, than other documents appearing on the same domain, the same nameserver, or in the same IP subnet, as example.com may be more likely to be fraudulent.

Exemplary Implementations

Figure 7A:
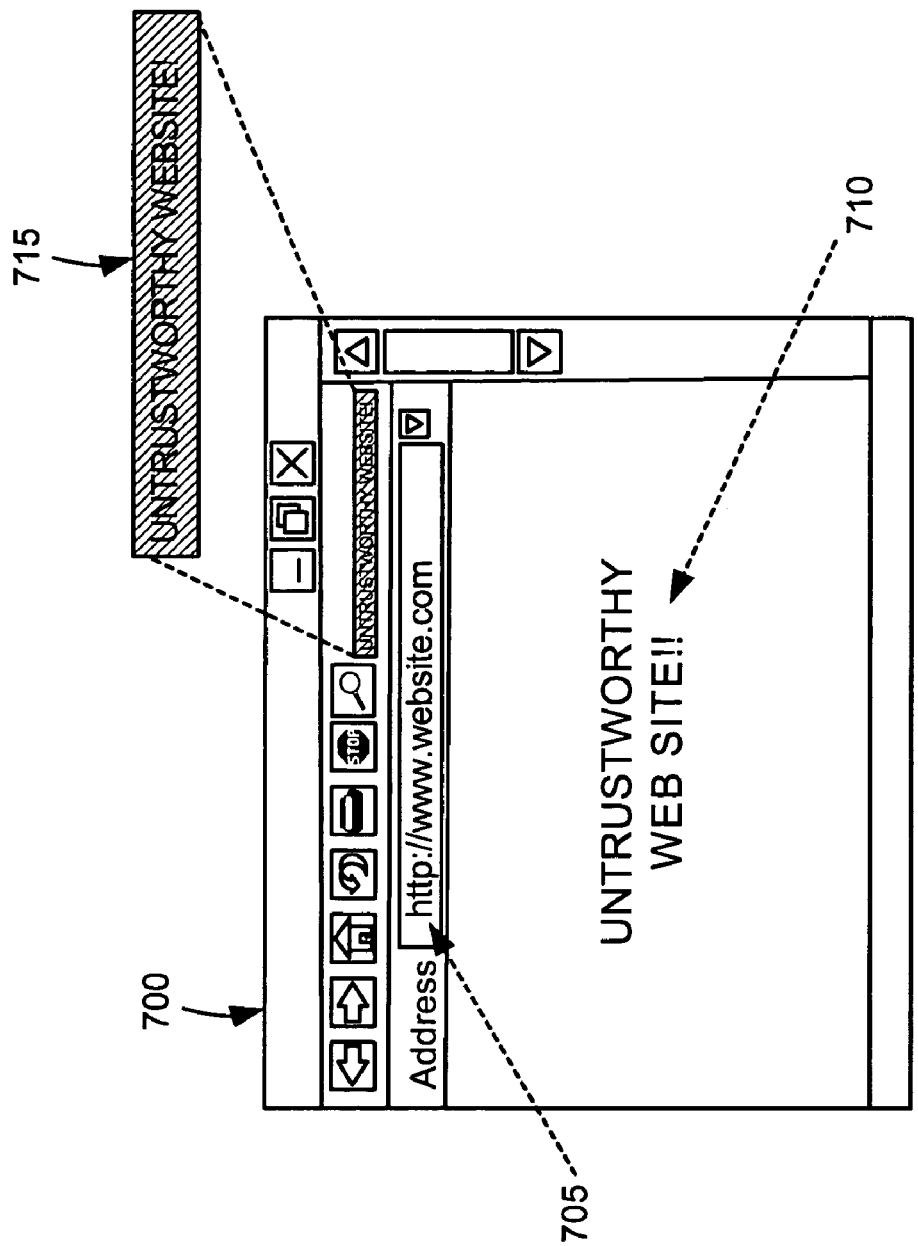
FIGS. 7A and 7B are diagrams of exemplary implementations of the invention.
Figure 7B:
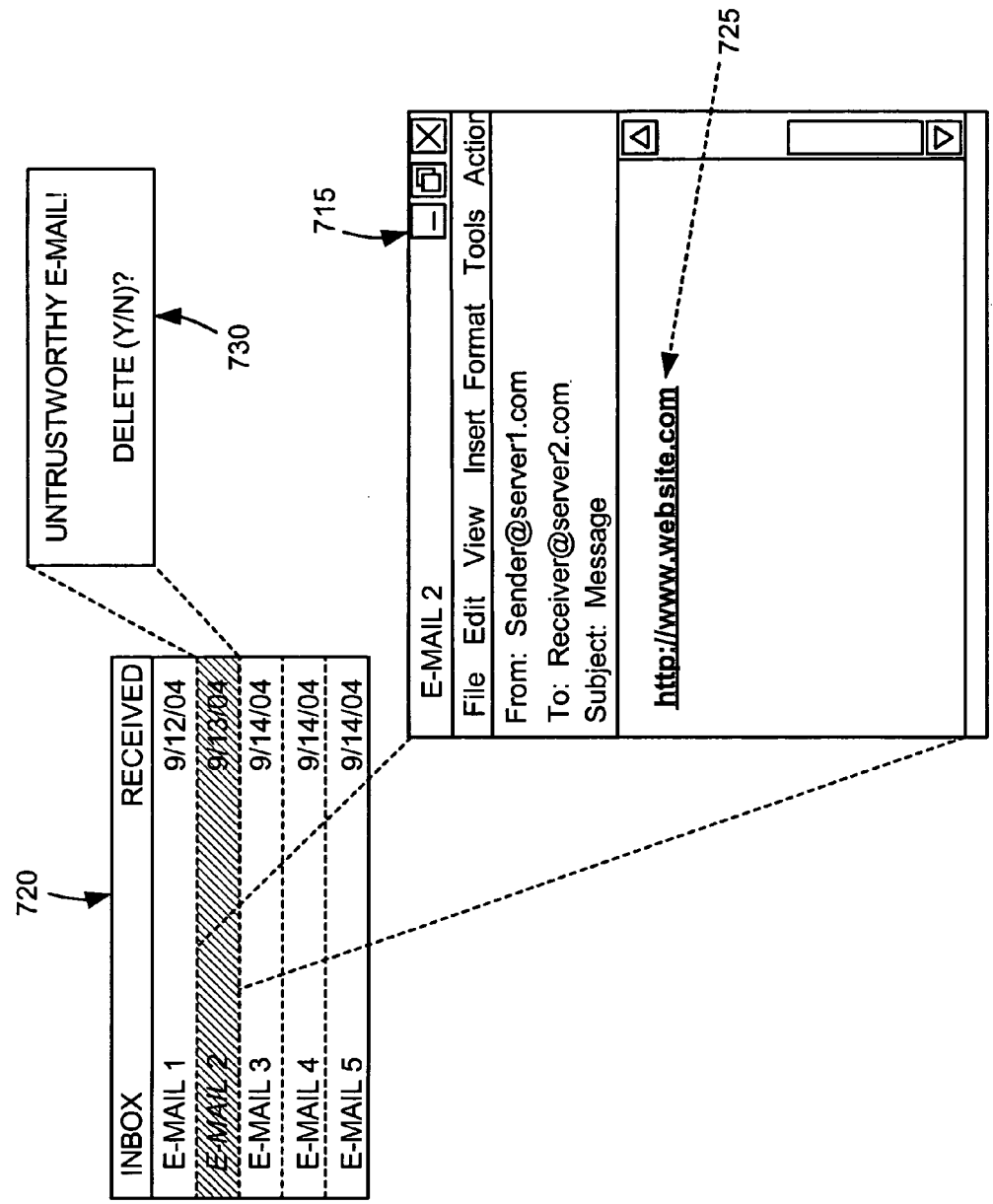

FIGS. 7A and 7B illustrate exemplary implementations in which a suspect website and an e-mail with a link to the suspect website is determined to be untrustworthy. As shown in FIG. 7A, a user may attempt to access a website having a URL "www.website.com" 705 via a browser 700. According to the exemplary process described above with respect to FIGS. 5A and 5B, the website may be determined to be untrustworthy. A document 710 may then be presented to the user indicating that the website is untrustworthy. The document 710 may wholely, or partially, obscure the actual displayed content of the accessed website. Additionally, a browser "flag" 715 may be presented in the browser 700 warning of the untrustworthy website.

As shown in FIG. 7B, a user (receiver@server2.com) may receive an e-mail 715 from an e-mail source (sender@server1.com) in the user's inbox 720. E-mail 715 may include a link 725 to a website having a URL www.website.com. According the exemplary process described above with respect to FIGS. 5A and 5B, the website may be determined to be untrustworthy. Notice of the untrustworthiness may be provided to the user, such as, for example, via a window 730. The user may elect to delete the untrustworthy e-mail in accordance with a request contained in the window 730. In other implementations, the untrustworthy e-mail 715 may be automatically deleted, flagged in some manner, or placed in a special folder.

Conclusion

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 5A, 5B, 6A, 6B and 6C, the order of the acts may be modified in other implementations consistent with the principles of the invention. Furthermore, other document related data or attributes than those described above with respect to FIGS. 6A-6C may be used consistent with principles of the invention. For example, a link structure or content of a site associated with a suspect document may be analyzed. Fraudulent sites often do not include a full set of documents whereas legitimate sites often are composed of many documents and exhibit regular structure. As another example, contact information provided for a suspect document, or a domain or site associated with the suspect document, may be inspected. If there is no contact information, or if the contact information exhibits certain characteristics (i.e., characteristics indicative of being fake), then the suspect document may potentially be fraudulent. Contact information may be verified using "whitepages" or other information on the web or in e-mail.

As a further example, user histories may be analyzed. If a user visits a suspect document, or a site or domain associated with the suspect document, then the document may be less likely to be fraudulent. As another example, known fraudulent documents or e-mails may be analyzed and compared to suspect documents or e-mails. As a further example, icons and/or images in a suspect document may be compared with authentic icons and/or images. A fraudulent site may copy the icons and/or images of an authentic site. As additional examples, third party stamps of approval (e.g., trustE) of a suspect document, the presence of files with viruses or other malicious content, positive mention of the suspect document, or associated site, in the news, or negative mention of the suspect document, or associated site, in the news may be used in assigning a fraud score to a suspect document of e-mail. Additionally, non-dependent acts may be performed in parallel.

It will also be apparent to one of ordinary skill in the art that aspects of the invention, as described above, may be implemented in many different forms of software, firmware, and hardware in the implementations illustrated in the figures.

The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein. Further, certain portions of the invention have been described as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
   determining, by one or more processors of the one or more server devices, whether a document in a set of ranked documents requests personal or private information, where documents in the set of ranked documents that are well known are ranked higher than documents that are not well known;
   analyzing, by one or more processors of the one or more server devices, if the document is determined to request personal or private information, data or attributes associated with the document, where the analyzing the data or attributes associated with the document includes analyzing a ranking of the document relative to rankings of other documents in the set of ranked documents;
   calculating, by one or more processors of the one or more server devices, a fraud score for the document based on the analysis;
   comparing, by one or more processors of the one or more server devices, the fraud score to a first threshold and a second different threshold;
   designating, by one or more processors of the one or more server devices, the document as trustworthy when the fraud score does not pass the first threshold;
   designating, by one or more processors of the one or more server devices, the document as untrustworthy when the fraud score passes the second different threshold;
   obtaining, by one or more processors of the one or more server devices, a designation of trustworthiness from a user when the fraud score is between the first threshold and the second different threshold; and
   associating, in a memory associated with the one or more server devices, an indication of a trustworthiness of the document, determined based on the designation of the document as trustworthy, the designation of the document as untrustworthy, or the designation of trustworthiness obtained from a user, with the fraud score and an identifier for the document.

2. The method of claim 1, further comprising:
   alerting a user if the document is designated as untrustworthy.

3. The method of claim 1, further comprising:
   preventing a user from providing the requested personal information if the document is designated as untrustworthy.

4. The method of claim 1, further comprising:
   inhibiting access to the document if the document is designated as untrustworthy.

5. The method of claim 4, where inhibiting access to the document comprises:
   denying access to the document if the document is designated as untrustworthy.

6. The method of claim 1, where the document is associated with an electronic message and the method further comprises:
   inhibiting access to the electronic message if the document is designated as untrustworthy.

7. The method of claim 6, where the electronic message includes a link to the document.

8. The method of claim 6, where inhibiting access to the electronic message comprises:
   deleting the electronic message prior to user access if the document is designated as untrustworthy.

9. The method of claim 1, where analyzing data or attributes associated with the document further comprises:
   analyzing a history of the document to determine an age of the document, or an age of a site associated with the document.

10. The method of claim 1, where analyzing data or attributes associated with the document comprises:
    identifying documents that are similar to the document and comparing rankings of the identified documents with a ranking of the document.

11. The method of claim 1, where analyzing data or attributes associated with the document further comprises:
    analyzing a content of the document to determine if the document has characteristics of known fraudulent documents.

12. The method of claim 1, where analyzing data or attributes associated with the document further comprises:
    identifying another document that is similar to the document and analyzing anchor text contained in an aggregated corpus of documents that refer to the document or the identified other document.

13. The method of claim 12, further comprising:
    determining if the anchor text contained in the aggregated corpus of documents refers to the identified other document and not to the document.

14. The method of claim 1, where analyzing data or attributes associated with the document further comprises:
    analyzing links to the document contained in other documents or in an electronic message.

15. The method of claim 14, further comprising:
    determining if the links to the document attempt to convey that the document is a trusted document when the document is not a trusted document.

16. The method of claim 1, where analyzing data or attributes associated with the document further comprises:
    analyzing a content of the document for code used to deceive users.

17. The method of claim 1, where analyzing data or attributes associated with the document further comprises:
    analyzing feedback from users providing alerts regarding fraudulent documents or electronic messages.

18. The method of claim 1, where analyzing data or attributes associated with the document further comprises:
    analyzing a watermark embedded in the document.

19. The method of claim 1, where analyzing data or attributes associated with the document further comprises:
    analyzing user selections of documents from results from an executed search.

20. The method of claim 19, further comprising:
determining if a number of times the user selects the document is less than a third threshold.

21. The method of claim 1, where the document is associated with a received electronic message and where analyzing data or attributes associated with the document further comprises:
comparing the received message with a content, structure, or appearance of other verified authentic electronic messages.

22. The method of claim 21, further comprising:
determining if the received electronic message is not similar in content, structure or appearance to the other verified authentic electronic messages.

23. The method of claim 21, further comprising:
determining if the received electronic message includes links that are different than links contained in the other verified authentic electronic messages.

24. The method of claim 1, where analyzing data or attributes associated with the document further comprises:
analyzing references to the document, or to a domain associated with the document, over time in received electronic messages.

25. The method of claim 24, further comprising:
determining if the references to the document appear in the received electronic messages.

26. The method of claim 1, where analyzing data or attributes associated with the document further comprises:
determining if the document is from a domain, an Internet Protocol (IP) subnet, or a nameserver that is associated with one or more known fraudulent documents.

27. A method performed by one or more server devices, the method comprising:
determining, by one or more processors of the one or more server devices, that a document in a set of ranked documents requests personal or private information from a user, where documents in the set of ranked documents that are well known are ranked higher than documents that are not well known;
identifying, by one or more processors of the one or more server devices, the document as being suspect based on whether the document requests personal or private information from the user;
analyzing, by one or more processors of the one or more server devices, data or attributes associated with the suspect document, where analyzing data or attributes associated with the suspect document includes analyzing a ranking of the suspect document relative to rankings of other documents in the set of ranked documents;
assigning, by one or more processors of the one or more server devices, a fraud score, based on analyzing the data or attributes, to the suspect document;
comparing, by one or more processors of the one or more server devices, the fraud score to a first threshold and to a second different threshold;
determining, by one or more processors of the one or more server devices, that the suspect document is trustworthy when the fraud score does not pass the first threshold;
determining, by one or more processors of the one or more server devices, that the suspect document is untrustworthy when the fraud score passes the second different threshold;
obtaining, by one or more processors of the one or more server devices, a determination of trustworthiness from the user when the fraud score is between the first threshold and the second different threshold; and
storing an identifier for a document, the fraud score, and a result representing a trustworthiness of the suspect document in a memory associated with the one or more server devices.

28. The method of claim 27, further comprising:
inhibiting access to the suspect document when the suspect document is determined to be untrustworthy.

29. The method of claim 28, where inhibiting access to the suspect document comprises:
denying access to the suspect document when the suspect document is determined to be untrustworthy.

30. The method of claim 27, where the suspect document is associated with an electronic message and further comprising:
inhibiting access to the electronic message when the suspect document is determined to be untrustworthy.

31. The method of claim 30, where the electronic message includes a link to the suspect document.

32. The method of claim 30, where inhibiting access to the electronic message comprises:
deleting the electronic message prior to user access when the suspect document is determined to be untrustworthy.

33. The method of claim 27, where analyzing data or attributes associated with the suspect document further comprises:
analyzing a history of the suspect document to determine its age.

34. The method of claim 27, where analyzing data or attributes associated with the suspect document comprises:
identifying other documents that are similar to the suspect document and comparing the rankings of the identified other documents with the ranking of the suspect document.

35. The method of claim 27, where analyzing data or attributes associated with the suspect document further comprises:
analyzing a content of the suspect document to determine if the suspect document has characteristics of fraud.

36. The method of claim 27, where analyzing data or attributes associated with the suspect document further comprises:
identifying another document that is similar to the suspect document and analyzing anchor text contained in an aggregated corpus of documents that refer to the suspect document or the identified other document.

37. The method of claim 36, further comprising:
assigning the fraud score to the suspect document based on whether the anchor text contained in the aggregated corpus of documents refers to the identified other document and not to the suspect document.

38. The method of claim 27, where analyzing data or attributes associated with the suspect document further comprises:
analyzing links to the suspect document contained in other documents or in an electronic message.

39. The method of claim 38, further comprising:
assigning a fraud score to the suspect document based on whether the links to the suspect document attempt to deceive a user into believing that the document is a trusted document.

40. The method of claim 27, where analyzing data or attributes associated with the suspect document further comprises:
analyzing a content of the suspect document for code used to deceive users.

41. The method of claim 27, where analyzing data or attributes associated with the suspect document further comprises:
analyzing feedback from users providing alerts regarding fraudulent documents or electronic messages.

42. The method of claim 27, where analyzing data or attributes associated with the suspect document further comprises:
analyzing a watermark embedded in the suspect document.

43. The method of claim 27, where analyzing data or attributes associated with the suspect document further comprises:
analyzing user selections of documents from results from an executed search.

44. The method of claim 43, further comprising:
assigning a fraud score to the suspect document based on whether a number of times the user selects the suspect document is less than a third threshold.

45. The method of claim 27, where the suspect document is associated with an electronic message, and where analyzing data or attributes associated with the suspect document further comprises:
comparing the received message with a content, structure, or appearance of other verified authentic electronic messages.

46. The method of claim 45, further comprising:
assigning a fraud score to the suspect document based on whether the received message is not similar in structure or appearance to the other verified authentic electronic messages.

47. The method of claim 46, further comprising:
assigning a fraud score to the suspect document based on whether the received message includes links that are different than links contained in the other verified authentic electronic messages.

48. The method of claim 47, where the links that are different than the links contained in the other verified authentic electronic messages are similar in appearance.

49. The method of claim 27, where analyzing data or attributes associated with the suspect document further comprises:
analyzing references to the suspect document over time in received electronic messages.

50. The method of claim 49, further comprising:
assigning a fraud score to the suspect document based on whether the references to the suspect document appear in the received electronic messages.

51. The method of claim 27, where analyzing data or attributes associated with the suspect document further comprises:
determining if the suspect document is from a domain, an Internet Protocol (IP) subnet, or a nameserver that is associated with one or more known fraudulent documents.

52. The method of claim 51, further comprising:
assigning a fraud score to the suspect document based on whether the suspect document is from a domain, or an IP subnet, or a nameserver that is associated with one or more known fraudulent documents.

53. A computer-readable memory device containing instructions for controlling at least one processor to perform a method, the computer-readable memory device storing one or more instructions for:
identifying a document in a ranked set of documents as being suspect based on whether the document requests personal or private information from a user, where documents in the set of ranked documents that are well known are ranked higher than documents that are not well known;
analyzing data or attributes associated with the suspect document, where analyzing data or attributes associated with the suspect document includes analyzing a ranking of the suspect document relative to rankings of other documents in the set of ranked documents;
assigning a fraud score, based on the analyzed data or attributes, to the suspect document;
comparing the fraud score to a first threshold and to a second different threshold;
determining that the suspect document is trustworthy when the fraud score does not pass the first threshold;
determining that the suspect document is untrustworthy when the fraud score passes the second different threshold;
obtaining a determination of trustworthiness from a user when the fraud score is between the first threshold and the second different threshold; and
storing an identifier for the suspect document, the fraud score, and a designation of a trustworthiness of the suspect document in a memory.

54. The computer-readable memory device of claim 53, where analyzing data or attributes associated with the suspect document further comprises:
identifying documents that are similar to the suspect document and comparing rankings of the identified documents with a ranking of the document.

55. The computer-readable memory device of claim 53, where analyzing data or attributes associated with the suspect document further comprises:
analyzing a content of the suspect document to determine if the suspect document has characteristics of known fraudulent documents.

56. A system, comprising:
a processing unit to:
identify a document, from a corpus of ranked documents hosted on one or more servers, as being suspect based on whether the document requests personal or private information from a user, where documents in the corpus of ranked documents that are more well known are ranked higher than documents that are less well known,
analyze data or attributes associated with the suspect document by analyzing a ranking of the suspect document relative to other documents from the corpus of ranked documents,
assign a fraud score, based on the analyzed data or attributes, to the suspect document that indicates whether the suspect document is potentially fraudulent, and
assign a trustworthiness value, based on the fraud score, to the suspect document that indicates a trustworthiness of the suspect document; and
a data repository to store, for the suspect document in the corpus of documents:
a document identifier,
the fraud score, and
the trustworthiness value.

57. The system of claim 56, where, when analyzing data or attributes associated with the suspect document, the processing unit is further configured to:
analyze a history of the suspect document to determine an age of the suspect, or an age of a site associated with the suspect document.

58. The system of claim 56, where the processing unit is further to:
alert the user if the trustworthiness value indicates that the suspect document is untrustworthy.

59. The system of claim 56, where the processing unit is further to:
prevent the user from providing the requested personal information or private information if the trustworthiness value indicates that the suspect document is untrustworthy.

60. The system of claim 56, where the processing unit is further to:
inhibit access to the suspect document if the trustworthiness value indicates that the suspect document is untrustworthy.

61. The system of claim 56, where the suspect document is associated with an electronic message and where the processing unit is further to:
inhibit access to the electronic message if the trustworthiness value indicates that the suspect document is untrustworthy.

62. The system of claim 61, where the electronic message includes a link to the suspect document.

63. The system of claim 61, where, when inhibiting access to the electronic message, the processing unit is further to:
delete the electronic message prior to user access if the trustworthiness value indicates that the suspect document is untrustworthy.

64. The system of claim 56, where, when analyzing data or attributes associated with the suspect document, the processing unit is further to:
identify documents that are similar to the suspect document and compare rankings of the identified documents with a ranking of the suspect document.

65. The system of claim 56, where, when analyzing data or attributes associated with the suspect document, the processing unit is further to:
analyze a content of the suspect document to determine if the suspect document has characteristics of known fraudulent documents.

66. The system of claim 56, where, when analyzing data or attributes associated with the suspect document, the processing unit is further to:
identify another document that is similar to the suspect document and analyze anchor text contained in an aggregated corpus of documents that refer to the suspect document or the identified other document.

67. The system of claim 66, where, when identifying the other document, the processing unit is further to:
determine if the anchor text contained in the aggregated corpus of documents refers to the identified other document and not to the suspect document.

68. The system of claim 56, where, when analyzing data or attributes associated with the suspect document, the processing unit is further to:
analyze links to the suspect document contained in other documents or in an electronic message.

69. The system of claim 68, where, when analyzing the links to the suspect document, the processing unit is further to:
determine if the links to the suspect document attempt to convey that the suspect document is a trusted document when the suspect document is not a trusted document.

70. The system of claim 56, where, when analyzing data or attributes associated with the suspect document, the processing unit is further to:
analyze a content of the suspect document for code used to deceive users.

71. The system of claim 56, where, when analyzing data or attributes associated with the suspect document, the processing unit is further to:
analyze feedback from users providing alerts regarding fraudulent documents or electronic messages.

72. The system of claim 56, where, when analyzing data or attributes associated with the suspect document, the processing unit is further to:
analyze a watermark embedded in the suspect document.

73. The system of claim 56, where, when analyzing data or attributes associated with the suspect document, the processing unit is further to:
analyze user selections of documents from results from an executed search.

74. The system of claim 56, where the suspect document is associated with a received electronic message and where, when analyzing data or attributes associated with the suspect document, the processing unit is further to:
compare the received electronic message with a content, structure, or appearance of other verified authentic electronic messages.

75. The system of claim 74, where the processing unit is further to:
determine if the received electronic message is not similar in content, structure or appearance to the other verified authentic electronic messages.

76. The system of claim 74, where the processing unit is further to:
determine if the received electronic message includes links that are different than links contained in the other verified authentic electronic messages.

77. The system of claim 56, where, when analyzing data or attributes associated with the suspect document, the processing unit is further to:
analyze references to the suspect document, or to a domain associated with the suspect document, over time in received electronic messages.

78. The system of claim 77, where the processing unit is further to:
determine if the references to the suspect document appear in the received electronic messages.

79. The system of claim 56, where, when analyzing data or attributes associated with the suspect document, the processing unit is further to:
determine if the suspect document is from a domain, an Internet Protocol (IP) subnet, or a nameserver that is associated with one or more known fraudulent documents.

80. A method performed by one or more server devices, the method comprising:
determining, by one or more processors of the one or more server devices, whether a document requests personal or private information;
analyzing, by one or more processors of the one or more server devices and if the document requests personal or private information, data associated with the document to determine a trustworthiness of the document, where analyzing the data comprises any combination of at least two of the following:
analyzing, by one or more processors of the one or more server devices, a history of the document to determine an age of the document,
analyzing, by one or more processors of the one or more server devices, a ranking of the document relative to other documents, where documents that are well known are ranked higher than documents that are not well known, identifying, by one or more processors of the one or more server devices, documents that are similar to the document and comparing rankings of the identified documents with a ranking of the document, analyzing, by one or more processors of the one or more server devices, a content of the document to determine if the document has characteristics of known fraudulent documents, identifying, by one or more processors of the one or more server devices, documents that are similar to the document and analyzing anchor text contained in an aggregated corpus of documents that refer to the document or the identified similar documents, analyzing, by one or more processors of the one or more server devices, whether the links to the document contained in other documents or in an electronic message, determining, by one or more processors of the one or more server devices, whether the links to the document attempt to convey that the document is a trusted document when the document is not a trusted document, analyzing, by one or more processors of the one or more server devices, a content of the document for code used to deceive users, analyzing, by one or more processors of the one or more server devices, feedback from users providing alerts regarding fraudulent documents or electronic messages, analyzing, by one or more processors of the one or more server devices, a watermark embedded in the document, analyzing, by one or more processors of the one or more server devices, user selections of documents from results from an executed search, analyzing, by one or more processors of the one or more server devices, references to the document over time in received electronic messages, and determining, by one or more processors of the one or more server devices, if the document is from a domain, nameserver, or an Internet Protocol (IP) subnet that is associated with one or more known fraudulent documents;

assigning, by one or more processors of the one or more server devices, a score, based on the analyzed data, to the document;

comparing, by one or more processors of the one or more server devices, the score to a first threshold and to a second different threshold;

designating, by one or more processors of the one or more server devices, the document as trustworthy when the score does not pass the first threshold;

designating, by one or more processors of the one or more server devices, the document as untrustworthy when the score passes the second different threshold;

obtaining, by one or more processors of the one or more server devices, a designation of trustworthiness from a user when the score is between the first threshold and the second different threshold; and storing, in a memory associated with the one or more server devices, an indication of trustworthiness for the document, determined based on designating the document as trustworthy, designating the document as untrustworthy, or obtaining a designation of trustworthiness, with the score and an identifier for the document.

81. The method of claim 80, further comprising:
alerting a user if the document is designated as untrustworthy.

82. The method of claim 80, further comprising:
preventing a user from providing the requested personal information if the document is designated as untrustworthy.

83. A method performed by one or more server devices, the method comprising:

receiving a query, at one or more processors of the one or more server devices, inquiring about a document in a set of ranked documents, where documents in the set of ranked documents that are well known are ranked higher than documents that are not well known;

determining, by one or more processors of the one or more server devices, a fraud score for the document based on one or more factors, where the one or more factors include a ranking of the document relative to other documents in the set of ranked documents;

designating, by one or more processors of the one or more server devices, the document as trustworthy when the fraud score does not pass a first threshold;

designating, by one or more processors of the one or more server devices, the document as untrustworthy when the fraud score passes a second different threshold;

obtaining, by one or more processors of the one or more server devices, a designation of trustworthiness from a user when the fraud score is between the first threshold and the second different threshold; and storing, in a memory associated with the one or more server devices, an indication of the trustworthiness of the document, determined based on designating the document as trustworthy, designating the document as untrustworthy, or obtaining a designation of trustworthiness, with the fraud score and an identifier for the document.

84. The method of claim 83, where the query originates from an e-mail application.

85. The method of claim 84, where the e-mail application is a web-based e-mail application.

86. The method of claim 83, where the query is sent in response to receipt of an e-mail that includes a reference to the document.

87. The method of claim 83, where the query is sent in response to a user attempting to access the document via a browser.

88. The method of claim 83, where the document requests personal or private information from a user accessing the document.

* * * * *

UNITED STATES PATENT AND TRADEMARK OFFICE
CERTIFICATE OF CORRECTION

| | | |
|---|---|---|
| PATENT NO. | : 8,056,128 B1 | Page 1 of 1 |
| APPLICATION NO. | : 10/954007 | |
| DATED | : November 8, 2011 | |
| INVENTOR(S) | : Dingle et al. | |

It is certified that error appears in the above-identified patent and that said Letters Patent is hereby corrected as shown below:

Column 15, line 58, claim 52 should read: "whether the suspect document is from a domain, an IP"
Column 20, line 11, claim 81 should read: "alerting the user if the document is designated as untrustwor-"

Signed and Sealed this
Seventeenth Day of January, 2012

David J. Kappos
*Director of the United States Patent and Trademark Office*